(12) United States Patent
Kobayashi et al.

(10) Patent No.: US 6,858,312 B2
(45) Date of Patent: Feb. 22, 2005

(54) AQUEOUS COMPOSITIONS AND PROCESS FOR THE SURFACE MODIFICATION OF ARTICLES BY USE OF THE AQUEOUS COMPOSITIONS

(75) Inventors: Nobuyuki Kobayashi, Tokyo (JP); Shinya Tsuchida, Tokyo (JP); Takanori Sannan, Tokyo (JP); Kazuya Tanaka, Tokyo (JP); Tetsuo Otsuki, Tokyo (JP); Ryoji Morita, Tokyo (JP)

(73) Assignees: Dainichiseika Color & Chemicals Mfg. Co., Ltd., Tokyo (JP); Nihon Parkerizing Co., Ltd., Tokyo (JP)

( * ) Notice: Subject to any disclaimer, the term of this patent is extended or adjusted under 35 U.S.C. 154(b) by 108 days.

(21) Appl. No.: 10/296,940

(22) PCT Filed: Jul. 6, 2001

(86) PCT No.: PCT/JP01/05919

§ 371 (c)(1),
(2), (4) Date: Dec. 10, 2002

(87) PCT Pub. No.: WO02/06410

PCT Pub. Date: Jan. 24, 2002

(65) Prior Publication Data

US 2004/0092620 A1 May 13, 2004

(51) Int. Cl.[7] .................... B32B 15/04; B32B 15/18; B32B 15/20; C08B 37/08
(52) U.S. Cl. .................... 428/457; 428/532; 524/17; 524/21; 524/27; 524/284; 524/300; 524/322; 536/20; 106/162.2; 165/133; 165/134.1
(58) Field of Search ................ 428/457, 532; 524/17, 21, 27, 284, 300, 322; 536/20; 106/162.2; 165/133, 134.1

(56) References Cited

U.S. PATENT DOCUMENTS

| | | | |
|---|---|---|---|
| 4,528,283 A | | 7/1985 | Lang et al. |
| 5,599,916 A | * | 2/1997 | Dutkiewicz et al. ........... 536/20 |
| 5,708,152 A | * | 1/1998 | Lohmann et al. ............. 536/20 |
| 5,864,025 A | * | 1/1999 | Glasser et al. ................ 536/20 |
| 5,874,551 A | * | 2/1999 | Glasser et al. ................ 536/20 |
| 6,090,928 A | * | 7/2000 | Donges et al. ................ 536/20 |
| 6,197,322 B1 | * | 3/2001 | Dutkiewicz et al. ........ 424/412 |
| 6,306,835 B1 | * | 10/2001 | Daly et al. .................... 514/55 |
| 6,344,077 B1 | * | 2/2002 | Hong ...................... 106/162.2 |
| 6,509,039 B1 | * | 1/2003 | Nies .......................... 424/488 |
| 6,689,481 B2 | * | 2/2004 | Hamamura et al. ......... 428/457 |
| 6,698,507 B2 | * | 3/2004 | Hamamura et al. ......... 165/133 |

FOREIGN PATENT DOCUMENTS

| | | | |
|---|---|---|---|
| JP | 04-249151 | * | 9/1992 |
| JP | 7-102110 | | 4/1995 |
| JP | 07-190676 | * | 7/1995 |
| JP | 8-269383 | | 10/1996 |
| JP | 10-259347 | | 9/1998 |
| JP | 11-293149 | | 10/1999 |

* cited by examiner

Primary Examiner—Vivian Chen
(74) Attorney, Agent, or Firm—Oblon, Spivak, McClelland, Maier & Neustadt, P.C.

(57) ABSTRACT

Use of an aqueous composition, which has been prepared by dissolving (A) dihydroxypropylchitosan and (B) 1,2,3,4-butanetetracarboxylic acid (B) in an aqueous medium, makes it possible to provide articles excellent in hydrophilicity, antibacterial and deodorant activities, touch feeling, antifogging property, paper strength, dyeability, waterproofness, antifouling property and/or the like.

19 Claims, No Drawings

AQUEOUS COMPOSITIONS AND PROCESS FOR THE SURFACE MODIFICATION OF ARTICLES BY USE OF THE AQUEOUS COMPOSITIONS

TECHNICAL FIELD

This invention relates to aqueous compositions and also to a process for the surface modification of articles by use of the aqueous compositions, and more specifically to aqueous compositions useful for modifying surfaces of articles and also to a process for the surface modification of articles by use of the aqueous compositions. The present invention provides a variety of articles excellent in hydrophilicity, antibacterial and deodorant activities, touch feeling, anti-fogging property, paper strength, dyeability, antifouling property and/or the like.

BACKGROUND ART

An air conditioner provided with functions such as cooling, heating and dehumidification is equipped with heat-exchanging fins at its heat exchanger unit. In general, fin blanks for forming these heat-exchanging fins are made of aluminum or aluminum alloy as they are desired to have a light weight, excellent workability and superb thermal conductivity.

When such an air conditioner is operated in cooling mode, the heat exchanger unit is brought on an indoor side thereof to a temperature equal to or lower than the dew point of moisture in the air so that the moisture in the air is caused to condense and adhere on the indoor fins arranged on the heat exchanger unit. The shape which the condensed water takes on fin surfaces is determined depending on the wettability of the fin surfaces with water. On low-wettability fin surfaces, condensed water tends to take the form of substantially hemispherical water droplets and further, to form water bridges between the fins, thereby developing resistance to a flow of air through the heat exchanger unit and hence, impairing the air flowability and further producing a noise. In some instances, condensed water may scatter around to soil the peripheries of the air conditioner.

With a view to overcoming these problems, it has already been practiced to subject fin blanks to hydrophilization treatment on their surfaces. Proposed methods include, for example, use of an inorganic hydrophilizer composed of water glass or the like as a principal component (JP 2-423895 B, JP 3-77440 B); and use of an organic hydrophilizer, such as combined use of polyvinyl alcohol, a specific water-soluble polymer and a crosslinking agent (JP 1-299877 A), use of a polyacrylamide (JP 1-270977 A), use of a copolymer of a particular hydrophilic vinyl monomer (JP 6-306247 A), and use of carboxymethylcellulose polymer, N-methylolacrylamide, polyacrylic acid or a zirconium compound (Japanese Patent No. 2,520,308).

The methods making use of inorganic hydrophilizers can impart excellent hydrophilicity to the surfaces of fin blanks. Nonetheless, they are accompanied by a problem in that dies undergo severe wear upon pressing such fin blanks, because hydrophilic coatings formed on the surfaces of the fin blanks are made of a hard material composed of silica ($SiO_2$) as a principal component. They also involve another problem in that an unpleasant odor is felt in the beginning of cooling, as the hydrophilic coatings have property of readily adsorbing unpleasant odor components from the surrounding environment.

In the methods making use of organic hydrophilizers, on the other hand, the hydrophilizers themselves serve as nutrient sources for microorganisms so that microorganisms tend to grow in treatment baths and on hydrophilic coatings. Prevention of their grow this, therefore, needed. In these methods, rot-proof property is hence imparted to treatment baths as needed. Addition of an antibacterial agent to treatment baths is more or less effective for the prevention of rotting of the treatment baths. Any attempt to impart antibacterial activity to coatings themselves requires addition of the antibacterial agent in a greater amount, leading to a problem that the hydrophilicity of the coatings is impaired. To allow the antibacterial activity of hydrophilic coatings themselves to last longer, it has also been proposed to have an antibacterial substance dissolved out from the surfaces of the hydrophilic coatings. The hydrophilic coatings show antibacterial activity as long as the antibacterial substance dissolves out, but there is a limit to the period during which the antibacterial activity is exhibited.

With a view to imparting antibacterial activity to hydrophilic coatings in an attempt to resolve the above-described problems, it has been proposed to use, as a coating-forming material, chitosan having antibacterial activity and to form a chitosan-containing coating on a surface of a fin blank (JP 7-190676 A). This method requires use of an organic acid or an inorganic acid to form chitosan into an aqueous solution, as chitosan is insoluble in water. However, this acid is washed off with the above-described condensed water, resulting in a problem that the chitosan coatings are deprived of film strength and antibacterial activity. Use of a polymer acid such as polyacrylic acid as the above-mentioned organic acid has also been proposed (JP 11-293149 A). However, these methods which make use of chitosan are all accompanied by a problem that a very unpleasant odor is given off upon and after baking a coating on a surface of a fin blank. Such fin blanks are, therefore, not satisfactory as fin blanks for use in air conditioners.

Most of the above-described conventional methods develop a problem that, unless anti-corrosion coating treatment such as chromate treatment is applied to the surface of a fin blank before the formation of a hydrophilic coating thereon, the hydrophilic coating corrodes aluminum and powdering occurs when used for a long time. Upon surface treatment of a fin blank, anti-corrosion undercoating treatment is hence required. The surface treatment, therefore, has to be conducted in two stages. This is not preferred economically.

Therefore, an object of the present invention is to provide an aqueous composition, which has the following features: an excellent hydrophilic coating, which does not form water droplets, can be formed by applying single-stage treatment, specifically by directly coating the aqueous composition onto an article and drying and curing the thus-coated aqueous composition; the coating has excellent mechanical strength even in a state wet with water (hereinafter the property is referred to a word "waterproof" or "waterproofness"), so that it is excellent in waterproofness and corrosion resistance and also superb in lubricity, can withstand severe forming, and can exhibit sustainable hydrophilicity without being stained with adhered lube oil or the like; and moreover, the coating does not produce an unpleasant odor from the coating-forming material and remains free from occurrence of microorganisms such as mold over a long period. In other word, the coating combines both excellent waterproof strength and hydrophilicity. Another object of the present invention is to provide a process for the surface modification of an article by use of the aqueous composition.

DISCLOSURE OF THE INVENTION

The above-described objects can be achieve by the present invention to be described hereinafter. Described specifically, the present invention provides an aqueous composition comprising, in a form dissolved in an aqueous medium, the following components (A) and (B):

(A) dihydroxypropylchitosan, and (B) 1,2,3,4-butanetetracarboxylic acid [hereinafter referred to as "BTC (B)"], wherein the aqueous composition can form a waterproof coating when dried and cured; and also, a process for modifying a surface of an article, which comprises the following steps: coating the aqueous composition onto the surface of the article; and drying and curing the thus-coated aqueous composition.

BEST MODES FOR CARRYING OUT THE INVENTION

The present invention will hereinafter be described in more detail based on certain preferred embodiments.

"Dihydroxypropylchitosan (A)" required for the practice of the present invention is a substance disclosed in JP 59-8701 A, and can be obtained, for example, by reacting glycidol (2,3-epoxy-1-propanol) with chitosan, which is composed of 60 to 100% deacetylated chitin, at an appropriate ratio. It is also available under a different name "glyceryl-chitosan" on the market for use in the present invention.

It is not absolutely necessary for dihydroxypropylchitosan (A) to be in a pure form. It may contain to some extent byproducts formed by the above-described invention and unreacted substances, and may be in the form of powder or an aqueous solution. Dihydroxypropylchitosan includes three chitosan derivatives, that is, N-(2,3-dihydroxypropyl) chitosan, O-(2,3-dihydroxypropyl)chitosan and N,O-(2,3-dihydroxypropyl)chitosan. These chitosan derivatives are all usable in the present invention. It is, however, preferred to use N-(2,3-dihydroxypropyl)chitosan or N,O-(2,3-dihydroxypropyl)-chitosan or a mixture thereof.

The degree of dihydroxypropylation of dihydroxypropylchitosan (A) for use in the present invention may be preferably in a range of from about 0.1 to 5, more preferably in a range of from 0.4 to 5. Its weight average molecular weight may preferably be 10,000 to 3,000,000, with a range of from 50,000 to 1,000,000 being more preferred. A weight average molecular weight lower than 10,000 results in the formation of a coating of insufficient strength, while a weight average molecular weight higher than 3,000,000 leads to an aqueous composition of excessively high viscosity so that there is no choice other than limiting the concentration of dihydroxy-propylchitosan (A) to a considerably low level.

On the other hand, BTC (B) required for the practice of the present invention is also a known substance by itself, and is available on the market for use in the present invention. Incidentally, it is known to use BTC (B) in combination with a salt of a phosphorus oxo-acid as a catalyst for hydroxyl-containing, water-soluble polymers (JP 7-102110 A). It was, on the other hand, not known that a coating of waterproofness was made by the reaction of dihydroxypropylchitosan (A) and BTC (B) alone without aid of catalyst such as a salt of a phosphorus oxo-acid. It should be emphasized that the reaction does not need the addition of catalyst. Even if the reaction uses no catalyst, it leads the formation of strong waterproof and hydrophilic coating free from growth of microorganisms such as mold. Furthermore, an unpleasant odor generates from the coating made by a reaction of dihydroxypropylchitosan (A) and crosslinking agents except BTC (B) and limits use of the system strictly. It was, however, not known that the reaction of dihydroxypropylchitosan (A) and BTC (B) prevents the generation of the unpleasant odor.

The aqueous composition according to the present invention can be obtained by dissolving dihydroxypropylchitosan (A) and BTC (B) as essential components in an aqueous medium. Upon dissolution of the essential components in the aqueous medium, heating may be effected if necessary. The aqueous medium for use in the present invention may preferably be distilled water, but depending on the application of the aqueous composition of the present invention, ordinary tap water may be used. As a further alternative, a mixed solvent of a hydrophilic organic solvent such as an alcohol or a ketone and water may be used as needed.

Concerning the ratio of BTC (B) to Dihydroxypropylchitosan (A) to be used in the present invention, their weight ratio B/A in terms of solids may range from 0.1 to 3, preferably from 0.2 to 2. Use of BTC (B) at a B/A ratio smaller than 0.1 leads to the formation of a coating with insufficient waterproofness, thereby failing to exhibit sufficient inhibitory effect on the production of an unpleasant odor from dihydroxypropylchitosan during baking. On the other hand, use of BTC (B) at a B/A ratio greater than 3 results in the formation of a coating with lowered hydrophilicity and flexibility and also, is uneconomical because the water proofness of a coating is not improved in proportion with the amount of BTC.

As described above, the aqueous composition according to the present invention can be obtained by adding the above-described essential components in the aqueous medium and dissolving them optionally under heat. No particular limitation is imposed on the concentrations of the essential components. From the standpoint of workability upon using the aqueous composition, however, it is preferred that the total solid concentration of the essential components falls within a range of from 1 to 40 wt. %.

The aqueous composition according to the present invention may also contain a nonionic organic compound (C) or an organic compound containing oxyalkylene units (ring-opened units of an alkylene oxide) (C') in addition to dihydroxy-propylchitosan (A) and BTC (B).

Examples of the nonionic organic compound (C) and the organic compound (C') containing oxyalkylene units can include, but are not limited to, polyethylene oxide, polypropylene oxide, polytetramethylene oxide, random or block copolymer of ethylene oxide and propylene oxide, polyvinyl alcohol, polyoxyethylene alkyl ethers, polyester containing oxyalkylene units, polyamide containing oxyalkylene units, graft copolymer of polyvinyl alcohol with oxyethylene units, higher alkyl ethers, oxyethylene alkyl ethers, alkyl glycosides, alkyl polyglycosides, sucrose fatty acid esters, glycerin alkyl ethers, and glycerin alkyl esters. They can be used either singly or in combination. Concerning their molecular weights, no particular limitation is imposed.

If the article available from the use of the aqueous composition of this invention is subjected to severe forming such as deep drawing or spinning or ironing, it is very advantageous to have the nonionic organic compound (C) or the organic compound containing oxyalkylene units (C') included in the aqueous composition.

In this case, the ratio of the nonionic organic compound (C) or the organic compound containing oxyalkylene units (C') to dihydroxypropylchitosan (A), C/A or C'/A may preferably range from 0.03 to 3 in terms of solid weight ratio. A ratio smaller than 0.03 leads to a failure in exhibiting lubricity improving effect. A ratio greater than 3 leads to saturation of the effect and is not preferred.

The aqueous composition according to the present invention may also contain a surfactant (D). As the surfactant (D), an anionic surfactant, a cationic surfactant or an amphoteric surfactant can be used. Examples can include, but are not limited to, polyoxyethylene dodecyl amine, polyoxyethylene octadecyl amine, dimethyl dodecyl betaine, alkyl diamino ethyl glycines, N(N'-lanolin fatty acid amide propyl)N-ethyl-N,N-dimethyl ammonium ethylsulfate, lauryl betaines, alkyl phosphate betaines, alkyl imidazolines, higher alcohol sulfate esters, higher alkyl ether sulfate esters, and dialkyl sulfosuccinate salts.

The ratio of the surfactant (D) to dihydroxypropyl chitosan (A), D/A may preferably range from 0.01 to 0.15 in terms of solid weight ratio. The inclusion of the surfactant (D) in the aqueous composition can reduce a deterioration in hydrophilicity, which is caused by an auxiliary lubricant (coolant) coated on a surface of an article when the coated article is subjected to forming. A solid weight ratio smaller than 0.01 does not allow the resultant aqueous composition to exhibit hydrophilicity improving effect. On the other hand, a solid weight ratio greater than 0.15 results in a weak coating so that the waterproofness and corrosion resistance of the coating deteriorate when the coating is left over for a long time in a state wet with water. Solid weight ratios outside the above-described range are, therefore, not preferred.

To the aqueous composition according to the present invention, one or more of other readily water-soluble chitosan and derivatives such as hydroxyethyl chitosan and hydroxy-propylchitosan, lower mono- or di-carboxylic acids as auxiliary dissolvers, dihydrazides such as adipic acid dihydrazide as stabilizers, preservatives, mildewproofing agents, organic solvents, fine particulate fillers, lubricants, colorants and the like. In particular, illustrative of the colorants (D') are, from the standpoint of various durability, organic pigments such as phthalocyanin, azo, anthraquinone and quinacridone pigments; inorganic pigments such as titanium oxide, iron oxide and composite metal oxides; and carbon black. In the composition according to the present invention, these colorants (D') may be used in a range accounting for 0.1 to 10 wt. %.

The aqueous composition of the present invention obtained as described above, despite its inclusion of BTC (B), remains stable without thickening or gelling even when left over at 5 to 30° C. for 1 month or longer. Accordingly, it can be used as a one-pack treatment. By coating the aqueous composition on a surface of an article and drying and curing the thus-coated aqueous composition, a hydrophilic coating excellent in waterproofness is formed. As the coating under formation is exposed to an ultimate temperature of 100° C. or higher during the drying or curing, the coating is obtained as a waterproof coating firmed adhered on the surface of the article.

The aqueous composition according to the present invention is useful in various applications. For example, particles of dihydroxypropylchitosan, said particles having high hydrophilicity, can be obtained by spray drying the aqueous composition. These particles are useful, for example, as a support for various chromatographic techniques. The aqueous composition of the present invention is also useful as a surface modifier for various fiber products made of natural or synthetic fibers, paper, synthetic fiber, wood, glass, ceramics, pottery and chinaware, and synthetic resin articles, and provides a variety of products excellent in hydrophilicity, antibacterial and deodorant activities, touch feeling, antifogging property, paper strength, dyeability, waterproofness, antifouling property and/or the like. The aqueous composition according to the present invention is also useful as a surface treatment for metal articles especially made of at least one metal selected from the group consisting of iron, copper, aluminum and alloys thereof. A description will hereinafter be made taking as a representative example an application of the aqueous composition of the present invention to an aluminum-made fin blank for an air conditioner.

No particular limitation is imposed on a process for forming a hydrophilic coating on a surface of the aluminum-made fin blank. This process, however, can be conducted, for example, as will hereinafter be described by taking a heat-exchanging fin blank as an example.

Firstly, degreasing is applied to the surface of the aluminum blank. Illustrative examples of usable degreasing media can include, but are not specifically limited to, solvents, surfactants, aqueous alkaline solutions, and aqueous acidic solutions. If the surface is not smeared or covered with oil or dust, degreasing may be conducted by simply washing the surface with warm water of 60 to 80° C. For permitting direct coating of the aqueous composition of the present invention, it is important to obtain a clean aluminum surface.

The aqueous composition according to the present invention is directly coated on an aluminum surface and is then dried and cured. For the provision of further improved corrosion resistance, it is more preferred to apply certain anti-corrosion coating treatment to the aluminum surface in advance. No particular limitation is imposed on the treatment method and the type of a corrosion-resistant coating to be obtained. Illustrative of the treatment method are dipping treatment, spraying treatment and coating treatment. Examples of the corrosion-resistant coating can include inorganic corrosion-resistant coatings such as phosphorus chromate and zirconium coatings; and organic corrosion-resistant coatings such as urethane resin, acrylic resin and phenol resin coatings.

Onto the cleaned surface of the aluminum fin blank, the aqueous composition according to the present invention is coated by a suitable coating method, for example, roll coating, bar coating, spray coating or dip coating to give a dry coat weight of from 0.01 to 10 g/m$^2$. The thus-coated aqueous composition is then dried and cured under conditions consisting of an ultimate temperature of at least 100° C., more preferably from 130 to 220° C. and a curing time of from 1 second to 30 minutes such that a hydrophilic coating is formed on the surface of the fin blank. The heat-exchanging fin blank obtained as described above is coated with an auxiliary lube oil, subjected to forming and then dried, so that fins for a heat exchanger are obtained as intended.

The aqueous composition according to the present invention may also be applied to a heat exchanger assembled of aluminum components (post-coating treatment). In this case, no auxiliary lube oil is needed so that the heat exchanger is free of its effects.

When the heat-exchanging fins formed as described above are used as indoor fins in a cooling apparatus, water condensed by cooling spreads over the surfaces of the fins so that no water droplets are formed. As the condensed water does not form droplets, no bridges are formed between the fins. Further, the condensed water neither causes a noise nor scatters around to soil the peripheries. Moreover, the coating formed from the aqueous composition according to the present invention does not give off an odor even during its baking, although it is an organic coating. In addition, the coating has substantial antibacterial and deodorant activities. Even when the fins equipped with the coating are assembled in an air conditioner such as a room cooling apparatus or a car cooler and are repeatedly used over a long time, no unpleasant odor based on the coating forming material, no musty odor or no other unpleasant odor is given off during its use, to say nothing of the initial stage of its use. Moreover, no powdering takes place during use over a long time even when anti-corrosion coating treatment led by chromate treatment is not applied.

EXAMPLES

The present invention will next be described more specifically based on Examples and Comparative Examples, in which all designations of "%" are on a weight basis. It should however be borne in mind that the present invention is not limited by these Examples. The formulas of aqueous compositions employed as examples and comparative examples are presented in Table 1-1 to Table 1-3.

Preparation procedures of the aqueous compositions employed as examples will hereinafter be described.

Example 1

Dihydroxypropylchitosan (degree of dihydroxypropylation: 1.1, MW: 100,000) (5 g) was dispersed in purified water (80 g). Subsequent to addition of BTC (15 g), the resulting mixture was stirred for dissolution at room temperature for 4 hours to prepare an aqueous composition according to the present invention.

Examples 2–19

Aqueous compositions according to the present invention were prepared in a similar manner as in Example 1 except that the degree of dihydroxypropylation and weight average molecular weight (MW) of dihydroxypropylchitosan and the mixing ratio of BTC to dihydroxypropylchitosan were changed as shown in Table 1-1 and Table 1-2.

Example 20

Dihydroxypropylchitosan (degree of dihydroxypropylation: 1.1, MW: 100,000) (5 g) was dispersed in purified water (70 g). Subsequent to addition of BTC (5 g), the resulting mixture was stirred for dissolution at room temperature for 4 hours. An aqueous solution (5 g) of polyethylene oxide (MW: 20,000), the concentration of which had been adjusted to 5%, was added, followed by the addition of purified water to give a total amount of 100 g. The thus-prepared mixture was stirred for 30 minutes to obtain an aqueous composition according to the present invention.

Example 21

Dihydroxypropylchitosan (degree of dihydroxypropylation: 1.1, MW: 100,000) (5 g) was dispersed in purified water (50 g). Subsequent to addition of BTC (5 g), the resulting mixture was stirred for dissolution at room temperature for 4 hours. An aqueous solution (12.5 g) of PEO (product of Sanyo Chemical Industries, Ltd., MW: 20,000), the concentration of which had been adjusted to 40%, and an aqueous solution (12.5 g) of a PEO-PPO copolymer (a copolymer of polyethylene oxide and polypropylene oxide), the concentration of which had been adjusted to 40%, were then added. Finally, purified water was added to give a total amount of 100 g, whereby an aqueous composition according to the present invention was obtained.

Example 22

An aqueous composition according to the present invention was obtained in a similar manner as in Example 20 except that, before the total amount was finally adjusted with purified water, an aqueous solution (5 g) of sodium polyoxyethylene lauryl ether sulfate (the number of moles of added ethylene: 2), the concentration of which had been adjusted to 10%, was added.

Example 23

An aqueous composition according to the present invention was obtained in a similar manner as in Example 20 except that, before the total amount was finally adjusted with purified water, an aqueous solution (10 g) of 2-methylcarboxymethylhydroxy-ethyl imidazolinium, the concentration of which had been adjusted to 10%, was added.

Example 24

A colored aqueous composition according to the present invention was prepared in a similar manner as in Example 20 except that the 5% aqueous solution (5 g) of polyethylene oxide was replaced by a 5% aqueous solution (4 g) of polyvinyl alcohol ("DENKA POVAL K05", trade name; product of Denki Kagaku Kogyo Kabushiki Kaisha)and an aqueous dispersion (1 g) of phthalocyanine blue pigment, said aqueous dispersion having a solid content of 40%.

Example 25

An aqueous composition according to the present invention was obtained in a similar manner as in Example 21 except that, before the total amount was finally adjusted with purified water, an aqueous solution (10 g) of 2-methylcarboxymethylhydroxy-ethyl imidazolinium, the concentration of which had been adjusted to 10%, was added.

Preparation procedures of the aqueous compositions employed as comparative examples will hereinafter be described.

Comparative Example 1

Comparative Example 1 was an aqueous composition making use of lactic acid as an acid component. Dihydroxypropyl-chitosan (degree of dihydroxypropylation: 1.1, MW: 100,000) (5 g) was dispersed in purified water (80 g). Subsequent to addition of lactic acid (5 g), the resulting mixture was stirred for dissolution at room temperature for 4 hours. Purified water was then added to give a total amount of 100 g, whereby an aqueous composition of this comparative example was obtained.

Comparative Example 2

Comparative Example 2 was an aqueous composition making use of lactic acid as an acid component and used lactic acid at a smaller ratio relative to dihydroxypropylchitosan than Comparative Example 1. Dihydroxypropylchitosan (degree of dihydroxypropylation: 2.2, MW: 70,000) (10 g) was dispersed in purified water (80 g). Subsequent to addition of lactic acid (5 g), the resulting mixture was stirred for dissolution at room temperature for 4 hours. Purified water was then added to give a total amount of 100 g, whereby an aqueous composition of this comparative example was obtained.

Comparative Example 3

Comparative Example 3 was an aqueous composition making use of chitosan not subjected to dihydroxypropylation (degree of dihydroxypropylation: 0; MW: 100,000; hereafter simply called "chitosan"). The aqueous composition of this comparative example was obtained in a similar manner as in Example 1.

Comparative Example 4

Chitosan (3 g) was dispersed in purified water (50 g) Subsequent to addition of citric acid(6g), the resulting mixture was stirred at room temperature for 4 hours. Thereafter, a 20% aqueous solution (35 g) of polyacrylic acid ("Jurymer AC10H", trade name; MW: 50,000; product of Nihon Junyaku Co., Ltd.) was added. Purified water was then added to give a total amount of 100 g, whereby an aqueous composition of this comparative example was obtained.

Comparative Example 5

An aqueous solution (50 g) of polyvinyl alcohol ("DENKA POVAL K05", trade name; product of Denki Kagaku Kogyo Kabushiki Kaisha), the concentration of which had been adjusted to 10%, was added to purified water (30 g). Subsequent to addition of BTC (5 g), the resulting mixture was stirred at room temperature for 1 hour. Purified water was finally added to give a total amount of 100 g, whereby an aqueous composition of this comparative example was obtained.

Comparative Example 6

An aqueous solution (50 g) of polyvinyl alcohol ("DENKA POVAL K05", trade name; product of Denki Kagaku Kogyo Kabushiki Kaisha), the concentration of which had been adjusted to 10%, was added to purified water (30 g). Subsequent to addition of a 65% aqueous solution (4 g) of a urea resin ("Cymel UFR65", trade name; product of Mitsui Chemicals, Inc.), the resulting mixture was stirred for 1 hour. Further, a solution (10 g) of a polyamide resin ("AQ Nylon P-70", trade name; product of Toray Industries, Inc.), the concentration of which had been adjusted to 50%, was added, followed by stirring at room temperature for 1 hour. Purified water was finally added to give a total amount of 100 g, whereby an aqueous composition of this comparative example was obtained.

TABLE 1-1

Aqueous Compositions

| | Component (A) | | | Component (B) | | Component(s) (C) and/or C' | | Component(s) (D) and/or D' | | Water |
|---|---|---|---|---|---|---|---|---|---|---|
| | Degree of dihydroxy-propylation | MW (× $10^4$) | Parts by weight | Kind | Parts by weight | Kind | Parts by weight | Kind | Parts by weight | Parts by weight |
| Ex. 1 | 1.1 | 10 | 5 | BTC | 15 | — | — | — | — | 80 |
| Ex. 2 | 1.1 | 10 | 5 | BTC | 10 | — | — | — | — | 85 |
| Ex. 3 | 1.1 | 10 | 5 | BTC | 5 | — | — | — | — | 90 |
| Ex. 4 | 1.1 | 10 | 5 | BTC | 1 | — | — | — | — | 94 |
| Ex. 5 | 0.5 | 9 | 5 | BTC | 5 | — | — | — | — | 90 |
| Ex. 6 | 1.8 | 10 | 5 | BTC | 5 | — | — | — | — | 90 |
| Ex. 7 | 3.7 | 11 | 5 | BTC | 5 | — | — | — | — | 90 |
| Ex. 8 | 5 | 13 | 5 | BTC | 5 | — | — | — | — | 90 |
| Ex. 9 | 1.1 | 5 | 15 | BTC | 15 | — | — | — | — | 70 |
| Ex. 10 | 1.1 | 40 | 3 | BTC | 3 | — | — | — | — | 94 |
| Ex. 11 | 2.2 | 7 | 10 | BTC | 5 | — | — | — | — | 85 |
| Ex. 12 | 2.3 | 70 | 1.5 | BTC | 1 | — | — | — | — | 97.5 |

TABLE 1-2

Aqueous Compositions

| | Component (A) | | | Component (B) | | Component(s) (C) and/or C' | | Component(s) (D) and/or D' | | Water |
|---|---|---|---|---|---|---|---|---|---|---|
| | Degree of dihydroxy-propylation | MW (× $10^4$) | Parts by weight | Kind | Parts by weight | Kind | Parts by weight | Kind | Parts by weight | Parts by weight |
| Ex. 13 | 1.1 | 10 | 5 | BTC | 1.5 | — | — | — | — | 93.5 |
| Ex. 14 | 1.3 | 8 | 5 | BTC | 5 | — | — | — | — | 90 |
| Ex. 15 | 1.3 | 8 | 5 | BTC | 5 | — | — | — | — | 90 |
| Ex. 16 | 1.3 | 8 | 5 | BTC | 5 | — | — | — | — | 90 |
| Ex. 17 | 1.1 | 10 | 5 | BTC | 0.3 | — | — | — | — | 94.7 |
| Ex. 18 | 0.25 | 9 | 5 | BTC | 5 | — | — | — | — | 90 |
| Ex. 19 | 1.3 | 8 | 5 | BTC | 5 | — | — | — | — | 90 |
| Ex. 20 | 1.1 | 10 | 5 | BTC | 5 | PEO | 0.25 | — | — | 89.75 |
| Ex. 21 | 1.1 | 10 | 5 | BTC | 5 | PEO/ PEO + PPO | 5/5 | — | — | 80 |
| Ex. 22 | 1.1 | 10 | 5 | BTC | 5 | PEO | 0.25 | Anionic surfactant | 0.5 | 89.25 |

TABLE 1-2-continued

Aqueous Compositions

| | Component (A) | | | Component (B) | | Component(s) (C) and/or C' | | Component(s) (D) and/or D' | | Water |
|---|---|---|---|---|---|---|---|---|---|---|
| | Degree of dihydroxy-propylation | MW (× 10⁴) | Parts by weight | Kind | Parts by weight | Kind | Parts by weight | Kind | Parts by weight | Parts by weight |
| Ex. 23 | 1.1 | 10 | 5 | BTC | 5 | PEO | 0.25 | Amphoteric surfactant | 1 | 88.75 |
| Ex. 24 | 1.1 | 10 | 5 | BTC | 5 | PVA | 0.20 | Colorant | 0.4 | 89.4 |

TABLE 1-3

Aqueous Compositions

| | Component (A) | | | Component (B) | | Component(s) (C) and/or C' | | Component(s) (D) and/or D' | | Water |
|---|---|---|---|---|---|---|---|---|---|---|
| | Degree of dihydroxy-propylation | MW (× 10⁴) | Parts by weight | Kind | Parts by weight | Kind | Parts by weight | Kind | Parts by weight | Parts by weight |
| Ex. 25 | 1.1 | 10 | 5 | BTC | 5 | PEO/ PEO + PPO | 5/5 | Amphoteric surfactant | 1 | 79 |
| Comp. Ex. 1 | 1.1 | 10 | 5 | Lactic acid | 5 | — | — | — | — | 90 |
| Comp. Ex. 2 | 2.2 | 7 | 10 | Lactic acid | 5 | — | — | — | — | 85 |
| Comp. Ex. 3 | Chitosan (5 parts), BTC (15 parts) | | | | | | | | | 80 |
| Comp. Ex. 4 | Chitosan (3 parts), polyacrylic acid (7 parts), citric acid (6 parts) | | | | | | | | | 84 |
| Comp. Ex. 5 | PVA (5 parts), BTC (5 parts) | | | | | | | | | 90 |
| Comp. Ex. 6 | PVA (5 parts), urea resin (2.6 parts), polyamide resin (5 parts) | | | | | | | | | 87.4 |

Component (A): Dihydroxypropylchitosan,
component (B): BTC,
component (C): nonionic organic compound,
component (C'): organic compound containing oxyalkylene units,
component (D): surfactant,
component (D'): colorant,
PVA: polyvinyl alcohol.
Parenthesized parts in Comparative Examples 3–6 mean "parts by weight".
Polyacrylic acid: "Jurymer AC10H" (trade name, product of Nihon Junyaku Co., Ltd.; solid concentration: 20%; MW: 50,000) was used.
Polyvinyl alcohol: "DENKA POVAL K05" (trade name, product of Denki Kagaku Kogyo Kabushiki Kaisha) was used.
Urea resin: "Cymel UFR65" (trade name, product of Mitsui Chemicals, Inc.; solid concentration: 65%) was used.
Polyamide resin: "AQ Nylon P-70" (trade name, product of Toray Industries, Inc.; 100%) was used.

Using the aqueous compositions prepared in accordance with the formulas shown in Table 1-1 to Table 1-3, aluminum blanks with hydrophilic coatings were obtained by the below-described hydrophilic coating forming procedure, and by the below-described ranking methods, their ranking tests were conducted. The results of the ranking are presented in Table 2-1 to Table 2-5.

Procedure of Pretreatment

An alkaline degreasing agent, "Fine Cleaner 4377K" (trade name; product of Nihon Parkerizing Co., Ltd.) was diluted to 2% concentration with tap water to provide an aqueous solution. Against a surface of each aluminum sheet (JIS 1050) of 100 to 110 μm in thickness, the aqueous solution was sprayed at 60° C. for 10 seconds to conduct alkaline degreasing. The aluminum sheet was then washed with tap water and dried to provide a clean aluminum surface.

Forming Procedure of Hydrophilic Coating

Onto surfaces of aluminum sheets (10 cm×10 cm) cleaned by alkaline degreasing treatment as described above, the aqueous compositions of Examples 1–25 and Comparative Examples 1–6 were coated by a bar coater to give dry coat weights of 1 g/m², respectively. The aluminum sheets with the aqueous compositions coated thereon were then dried and cured under the corresponding conditions shown in Table 2-1 to Table 2-5 to provide as specimens for use in the following ranking tests.

(1) Odorlessness Ranking Test

Using those specimens, an organoleptic test was conducted immediately. Their smells were ranked in 6 stages in accordance with the following ranking standard.

Ranking Standard

5: Does not smell even when a specimen is smelled after breathing upon it.

4: Very slightly smells when a specimen is smelled after breathing upon it.

3: Does not smell when no breath is blown upon a specimen, but slightly smells when the specimen is smelled after breathing upon it.

2: Does not smell when no breath is blown upon a specimen, but smells when the specimen is smelled after breathing upon it.
1: Noticeably smells even when no breath is blown upon a specimen.
0: Strongly smells even when no breath is blown upon a specimen.

(2) Waterproofness Ranking Test

Each specimen was immersed in purified water for 24 hours, and was then dried for 30 minutes in a blast dryer controlled at 100° C. After the specimen was allowed to cool down to room temperature, the specimen was weighed. A coat remainder percent was determined in accordance with the below-described equation, and the waterproofness of the specimen was ranked in 5 stages in accordance with the following ranking standard.

$$\text{Coat remainder percent} = \frac{C-A}{B-A} \times 100(\%)$$

wherein
A: Weight of an aluminum sheet before hydrophilizing surface treatment.
B: Weight of the aluminum sheet after the hydrophilizing surface treatment.
C: Weight of the aluminum sheet after dipped for 24 hours in water subsequent to the hydrophilizing surface treatment.

Ranking Standard for Waterproofness
5: Percent coat remainder≧95%
4: 95%>coat remainder percent≧80%
3: 80%>coat remainder percent≧70%
2: 70%>coat remainder percent≧50%
1: 50%>coat remainder percent (3) Hydrophilicity Ranking Test
(3)-1 Initial Hydrophilicity Purified water (2 μL) was dropped onto the surface of each specimen held in a horizontal position. The contact angle of a water droplet so formed was measured by a contact angle meter ("CA-X Model", trade name; manufactured by KYOWA INTERFACE SCIENCE CO., LTD.) to rank its initial hydrophilicity in accordance with the following ranking standard.

Ranking Standard for Initial Hydrophilicity
5: Contact angle<5°
4: 5°≦contact angle<10°
3: 10°≦contact angle<15°
2: 15°≦contact angle<20°
1: 20°≦contact angle<30°
0: 30°≦contact angle (3)-2 Sustainable Hydrophilicity After each specimen was dipped for 1 minute in a volatile pressing oil, "RF-190" (trade name, product of Show a Shell Sekiyu K.K.), the specimen was dried at 150° C. for 5 minutes. Two types of specimens, one not treated with the volatile pressing oil (sustainable hydrophilicity A) and the other treated with the volatile pressing oil (sustainable hydrophilicity B), were immersed for 200 hours in flowing purified water and were then dried for 1 hour in a blast dryer controlled at 80° C. After drying, the contact angles of water droplets were measured in a similar manner as in the initial hydrophilicity test to rank their sustainable hydrophilicity in accordance with the following ranking standard.

Ranking Standard for Sustainable Hydrophilicity A

5: Contact angle<10°
4: 10°≦contact angle<15°
3: 15°≦contact angle<20°
2: 20°≦contact angle<30°
1: 30°≦contact angle<40°
0: 40°≦contact angle Ranking Standard for Sustainable Hydrophilicity B 5: Contact angle<10°
4: 10°≦contact angle<20°
3: 20°≦contact angle<30°
2: 30°≦contact angle<40°
1: 40°≦contact angle<50°
0: 50°≦contact angle (4) Corrosion Resistance Ranking Test Each specimen was subjected to a salt spray test up to the $500^{th}$ hour. After purified water was caused to run on and along the surface of the specimen, the specimen was dried for 1 hour in a blast dryer controlled at 100° C., and its external appearance was ranked in accordance with the following ranking standard.

Ranking Standard for Corrosion Resistance

5: Corrosion area percent=0%
4: 0%<corrosion area percent<5%
3: 5%≦corrosion area percent<10%
2: 10%≦corrosion area percent<30%
1: 30%≦corrosion area percent<70%
0: 70%≦corrosion area percent (5) Lubricity Ranking Test To investigate the lubricity of the surface of each specimen, its Bowden coefficient of friction was measured. On the surface of the specimen set on a stage of a Bowden ball/plane friction and wear tester (manufactured by Toyo Baldwin Co.), a 1/16" steel ball was caused to slide to calculate an initial coefficient of friction. The following ranking standard was followed.

Ranking Standard for Lubricity

5: Coefficient of friction<0.1
4: 0.1≦coefficient of friction<0.15
3: 0.15≦coefficient of friction<0.2
2: 0.2≦coefficient of friction<0.3
1: 0.3≦coefficient of friction<0.4
0: 0.4≦coefficient of friction The ranking of lubricity makes it possible to simulate formability. A score of at least 3 by the above-described ranking standard indicates a formability level which poses no problem in actual use.

TABLE 2-1

Results of Ranking

|  | Ex. 1 | Ex. 2 | Ex. 3 | Ex. 4 | Ex. 5 | Ex. 6 |
|---|---|---|---|---|---|---|
| Metal | Al | Cu | Al | Al | Al | Al |
| Pretreatment | Degreasing only | Degreasing only | Degreasing only | Note 2 | Degreasing only | Degreasing only |
| Drying and curing conditions |  |  |  |  |  |  |
| Temp. (° C.) | 200 | 200 | 200 | 200 | 200 | 200 |
| Time | 30 sec | 30 sec | 30 sec | 30 sec | 30 sec | 30 sec |
| Ranked property |  |  |  |  |  |  |
| Odorlessness | 5 | 5 | 5 | 4 | 5 | 5 |
| Waterproofness | 4 | 4 | 5 | 5 | 4 | 5 |
| Initial hydrophilicity | 4 | 4 | 5 | 4 | 4 | 5 |
| Sustainable hydrophilicity A | 4 | 4 | 5 | 4 | 4 | 5 |
| Sustainable hydrophilicity B | 4 | 4 | 4 | 4 | 4 | 4 |
| Corrosion resistance | 5 | Note 1 | 5 | 5 | 5 | 5 |
| Lublicity | 4 | 4 | 4 | 4 | 4 | 4 |

Note 1:
In Example 2, copper (JIS C1220) was used as a metal and the ranking of corrosion resistance was omitted.

Note 2:
In Example 4, phosphorus chromate treatment was applied as pretreatment. Spray-treated at 50° C. for 5 seconds with "ALCHROM K702" (trade name, product of Nihon Parkerizing Co., Ltd.) to give a Cr coat weight of 20 mg/m$^2$.

TABLE 2-2

Results of Ranking

|  | Ex. 7 | Ex. 8 | Ex. 9 | Ex. 10 | Ex. 11 | Ex. 12 |
|---|---|---|---|---|---|---|
| Metal | Al | Al | Al | Al | Al | Al |
| Pretreatment | Degreasing only | Degreasing only | Degreasing only | Degreasing only | Degreasing only | Degreasing only |
| Drying and curing conditions |  |  |  |  |  |  |
| Temp. (° C.) | 200 | 200 | 200 | 200 | 200 | 200 |
| Time | 30 sec | 30 sec | 30 sec | 30 sec | 30 sec | 30 sec |
| Ranked property |  |  |  |  |  |  |
| Odorlessness | 5 | 5 | 5 | 5 | 5 | 5 |
| Waterproofness | 5 | 5 | 5 | 5 | 5 | 5 |
| Initial hydrophilicity | 5 | 5 | 5 | 5 | 5 | 5 |
| Sustainable hydrophilicity A | 5 | 5 | 5 | 5 | 5 | 5 |
| Sustainable hydrophilicity B | 4 | 4 | 4 | 4 | 4 | 4 |
| Corrosion resistance | 4 | 5 | 5 | 5 | 4 | 4 |
| Lublicity | 4 | 4 | 4 | 4 | 4 | 4 |

TABLE 2-3

Results of Ranking

|  | Ex. 13 | Ex. 14 | Ex. 15 | Ex. 16 | Ex. 17 | Ex. 18 |
|---|---|---|---|---|---|---|
| Metal | Al | Al | Al | Al | Al | Al |
| Pretreatment | Degreasing only | Degreasing only | Degreasing only | Degreasing only | Degreasing only | Degreasing only |
| Drying and curing conditions |  |  |  |  |  |  |
| Temp. (° C.) | 220 | 220 | 160 | 130 | 200 | 200 |
| Time | 1 min | 15 sec | 1 min | 30 min | 30 sec | 30 sec |

TABLE 2-3-continued

Results of Ranking

| | Ex. 13 | Ex. 14 | Ex. 15 | Ex. 16 | Ex. 17 | Ex. 18 |
|---|---|---|---|---|---|---|
| Ranked property | | | | | | |
| Odorlessness | 4 | 5 | 4 | 5 | 3 | 5 |
| Waterproofness | 4 | 5 | 4 | 5 | 3 | 4 |
| Initial hydrophilicity | 4 | 5 | 4 | 4 | 4 | 3 |
| Sustainable hydrophilicity A | 4 | 5 | 5 | 5 | 3 | 3 |
| Sustainable hydrophilicity B | 4 | 4 | 4 | 4 | 3 | 3 |
| Corrosion resistance | 5 | 5 | 4 | 4 | 4 | 4 |
| Lublicity | 4 | 4 | 4 | 4 | 4 | 4 |

TABLE 2-4

Results of Ranking

| | Ex. 19 | Ex. 20 | Ex. 21 | Ex. 22 | Ex. 23 | Ex. 24 | Ex. 25 |
|---|---|---|---|---|---|---|---|
| Metal | Al | Al | Al | Al | Al | Al | Al |
| Pretreatment | Degreasing only | Degreasing only | Degreasing only | Degreasing only | Degreasing only | Degreasing only | Degreasing only |
| Drying and curing conditions | | | | | | | |
| Temp. (° C.) | 90 | 200 | 200 | 200 | 200 | 200 | 200 |
| Time | 30 min | 30 sec | 30 sec | 30 sec | 30 sec | 30 sec | 30 sec |
| Ranked property | | | | | | | |
| Odorlessness | 3 | 5 | 5 | 5 | 5 | 5 | 5 |
| Waterproofness | 4 | 5 | 5 | 4 | 4 | 4 | 3 |
| Initial hydrophilicity | 4 | 5 | 5 | 5 | 5 | 5 | 5 |
| Sustainable hydrophilicity A | 3 | 5 | 5 | 5 | 5 | 5 | 5 |
| Sustainable hydrophilicity B | 4 | 4 | 4 | 5 | 5 | 5 | 5 |
| Corrosion resistance | 3 | 5 | 5 | 4 | 4 | 4 | 3 |
| Lublicity | 3 | 5 | 5 | 5 | 5 | 5 | 5 |

TABLE 2-5

Results of Ranking

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Metal | Al | Al | Al | Al | Al | Al |
| Pretreatment | Degreasing only | Degreasing only | Degreasing only | Degreasing only | Degreasing only | Degreasing only |
| Drying and curing conditions | | | | | | |
| Temp. (° C.) | 200 | 200 | 200 | 200 | 200 | 200 |
| Time | 30 sec | 30 sec | 30 sec | 30 sec | 30 sec | 30 sec |
| Ranked property | | | | | | |
| Odorlessness | 0 | 0 | 4 | 0 | 2 | 4 |
| Waterproofness | 2 | 2 | 4 | 1 | 4 | 4 |
| Initial hydrophilicity | 3 | 4 | 2 | 4 | 3 | 3 |
| Sustainable hydrophilicity A | 1 | 1 | 2 | 1 | 2 | 2 |
| Sustainable hydrophilicity B | 0 | 0 | 1 | 0 | 0 | 0 |
| Corrosion resistance | 2 | 2 | 1 | 0 | 2 | 2 |
| Lublicity | 1 | 1 | 2 | 2 | 1 | 2 |

Concerning the ranking results, scores of at least 3 are not considered to pose any problem in actual use.

As is readily envisaged from the results of Table 2-1 to Table 2-5, good results were obtained in all of odorlessness, waterproofness and hydrophilicity owing to the use of BTC (B) in the present invention. In Examples 1–4, the aqueous compositions were prepared by adding BTC in varied amounts. The results of their ranking shown in Table 2-1 were good. In Examples 5–8, the aqueous compositions were prepared by using dihydroxypropylchitosan samples (A) of varied degrees of dihydroxypropylation. The results of their ranking were good. In Examples 9–12, the tests were carried out using dihydroxypropylchitosan samples (A) of varied weight average molecular weights and the resultant aqueous compositions had different concentrations. In Examples 13–16, the tests were conducted with varied drying and curing conditions. The results of Examples 9–16 were all acceptable.

Further, good performance was achieved even when a hydrophilic coating was applied to a different metal as in Example 2 or even when anti-corrosion coating treatment was applied as pretreatment as in Example 4.

In Example 17, the aqueous composition was prepared using BTC (B) and dihydroxypropylchitosan (A) at a B/A weight ratio of 0.06. Performance was slightly lowered in odorlessness, waterproofness and sustainable hydrophilicity. In Example 18, the use of dihydroxypropylchitosan (A) the degree of dihydroxypropylation of which was 0.25 resulted in somewhat lowered hydrophilicity. From these results, it is appreciated that the more preferred weight ratio of BTC (B) to dihydroxypropylchitosan (A), B/A, is in a range of from 0.1 to 3 and also that the more preferred degree of dihydroxy-propylation of dihydroxypropylchitosan (A) is in a range of from 0.4 to 5.

From Example 19, it is considered that a drying or curing temperature lower than 100° C. leads to some reductions in sustainable hydrophilicity, corrosion resistance and lubricity and hence, that the drying or curing temperature is preferably 100° C. or higher.

In Examples 20–25, the aqueous compositions of dihydroxypropylchitosan (A) and BTC (B) were added with a nonionic organic compound (C) or an organic compound (C') having oxyalkylene units, a surfactant (D) or a colorant (D'). Those aqueous compositions led to improvements in both sustainable hydrophilicity and lubricity after treatment with the pressing oil than the aqueous compositions of Examples 1–19. It is, therefore, understood that the aqueous compositions of Examples 20–24 are more preferred when articles with hydrophilic coatings applied thereon are subjected to smearing with pressing oil and/or to severe forming.

From Example 25, it is considered that use of a surfactant (D) and dihydroxypropylchitosan (A) at a D/A weight ratio of 0.2 leads to some reductions in corrosion resistance and waterproofness and accordingly, that a D/A weight ratio of 0.15 or lower is more preferred.

Incidentally, none of the aqueous compositions employed in the Examples developed thickening or gelling even after an elapsed time of 30 days.

In Comparative Examples 1 and 2, the aqueous compositions were prepared by changing the acid component from BTC (B) to lactic acid. This change led to deteriorations in odorlessness, waterproofness, sustainable hydrophilicity and lubricity.

In Comparative Example 3, the aqueous composition was prepared using undihydroxypropylated, simple chitosan and BTC (B). The aqueous composition gave poor results in all properties except odorlessness and waterproofness.

In Comparative Example 4, the aqueous composition was prepared using chitosan and polyacrylic acid. The aqueous composition gave poor results in odorlessness, waterproofness, sustainable hydrophilicity and corrosion resistance.

In Comparative Examples 5–6, the aqueous compositions were prepared using other water-soluble high molecular compounds. Both of the aqueous compositions gave poor results in the sustainable hydrophilicity after treated with the pressing oil.

A description will next be made about some other application examples of aqueous composition according to the present invention.

Application Example 1

Dihydroxypropylchitosan (degree of dihydroxypropylation: 1.1, molecular weight: 100,000) and BTC were formulated at a weight ratio of 1:1 into an aqueous solution having a dihydroxypropylchitosan concentration of 0.5%. A cloth which was 40 by 40 centimeters square was dipped in the aqueous solution, and the aqueous solution was wrung out of the cloth at a wringing rate of 100% on a roll wringer. The cloth was subjected to heat treatment at 150° C. for 5 minutes in a hot-air dryer, and a waterproof coating was fixedly applied on the cloth. The touch feeling of the thus-treated cloth was soft. The antibacterial activity of the treated cloth was determined in accordance with JIS L1902-98.

Sample bacteria: *Staphylococcus aureus*

Cyclic washing (10 cycles, JIS L0217 103)

Acceptability standard: bacteriostatic activity ≧ 2.2

|  | Bacteriostatic activity | |
| --- | --- | --- |
|  | Before washing | After washing |
| Cotton | 5.1 | 4.3 |
| Polyester/cotton mixed | 4.5 | 3.9 |
| Acrylic fibers | 3.5 | 3.0 |
| Silk | 4.2 | 4.0 |
| Wool | 3.7 | 3.0 |

From the above results, it was found that the cloths treated in accordance with the present invention retained sufficient antibacterial activity even after washed 10 times.

Application Example 2

A solution, which had been prepared by adding isopropyl alcohol to the aqueous composition of Example 1 at a weight ratio of 1:1, was coated onto a transparent polyester film, a white paper sheet and a laminated wood board by a bar coater to give dry coat weights of 0.5 g/m$^2$, respectively, followed by heat treatment at 130° C. for 3 minutes in a hot-air dryer. A single droplet of water was dropped onto the treated surface of the treated polyester film, and the treated surface was observed for possible changes. No marked swelling was observed on the coating and, even when rubbed, the coating was not separated. Using a dye-based ink, the treated white paper sheet was printed by an ink-jet printer manufactured by Seiko Epson Corporation. The treated white paper sheet was successfully printed without any problem. For the sake of comparison, the printed, treated paper sheet and an untreated paper sheet printed likewise were left over for 1 day, and water was dropped onto their printed surfaces. The prints blotted in the case of the untreated paper sheet, while the prints remained substantially free from blotting in the case of the paper sheet treated in accordance with the present invention. The treatment of the present invention was, therefore, effective for the setting of the dye. Further, a picture was drawn with a paint brush on the surface of the laminated wood board treated by the process of the present invention. Compared with an untreated laminated wood board, the treated laminated wood board was excellent in the development of light colors and, after drying, provided the picture with better waterproofness.

Application Example 3

The aqueous composition of Example 1 was coated onto the glass surface of a mirror to give a dry coat weight of 1 g/m$^2$, followed by heat treatment at 180° C. for 2 minutes. The thus-treated mirror was placed in a bathroom, and was observed for its fogging or clouding with steam and adhesion of water droplets. The mirror had good antifogging property. Further, the treated mirror was immersed for 24 hours in water and the pencil hardness of the treated surface was measured. Its pencil hardness was found to be "H", and the adhesion of the coating was also good.

CAPABILITY OF EXPLOITATION IN INDUSTRY

As has been described above, the present invention can provide aqueous compositions and also a process for the surface modification of articles by use of the aqueous compositions. The aqueous compositions and surface modification process have characteristic features. Described specifically, each aqueous composition can form an excellent hydrophilic coating, which does not permit formation of water droplets thereon, by applying single-stage treatment, specifically by applying the aqueous composition directly onto a surface of an article and drying and curing the same. Moreover, this coating has excellent waterproof strength even in a state wet with water, and therefore, is excellent in waterproofness and corrosion resistance. The coating has superb lubricity so that it can withstand severe forming. The coating can exhibit sustainable hydrophilicity without being smeared with adhered lube oil or the like. In addition, the coating gives off no unpleasant odor from the coating-forming material and remains free from occurrence of microorganisms such as mold over a long time.

What is claimed is:

1. An aqueous composition comprising, in a form dissolved in an aqueous medium, the following components (A) and (B):
   (A) dihydroxypropylchitosan, and
   (B) 1,2,3,4-butanetetracarboxylic acid,
wherein said aqueous composition can form a waterproof coating when dried and cured.

2. An aqueous composition according to claim 1, wherein a weight ratio of 1,2,3,4-butanetetracarboxylic acid (B) to dihydroxypropylchitosan (A), B/A is 0.1 to 3 in terms of solids.

3. An aqueous composition according to claim 1, wherein dihydroxypropylchitosan (A) has a weight average molecular weight of from 10,000 to 3,000,000.

4. An aqueous composition according to claim 1, wherein dihydroxypropylchitosan (A) has a degree of dihydroxypropylation of from 0.1 to 5.

5. An aqueous composition according to claim 1, wherein said aqueous composition has a solid concentration of from 1 to 40 wt. %.

6. An aqueous composition according to claim 1, further comprising the following component (C):
   (C) a nonionic organic compound, a weight ratio of said nonionic organic compound (C) to dihydroxypropylchitosan (A), C/A being 0.03 to 3 in terms of solids.

7. An aqueous composition according to claim 1, further comprising the following component (C'):
   (C') an organic compound containing oxyalkylene units, a weight ratio of said organic compound (C') to dihydroxy-propylchitosan (A), C'/A being 0.03 to 3 in terms of solids.

8. An aqueous composition according to claim 1, further comprising the following component (D):
   (D) a surfactant, a weight ratio of said surfactant (D) to dihydroxypropyl-chitosan (A), D/A being 0.01 to 0.15 in terms of solids.

9. An aqueous composition according to claim 1, further comprising a colorant.

10. A process for modifying a surface of an article, which comprises the following steps;
    coating an aqueous composition as defined in claim 1 onto said surface of said article; and
    drying and curing the thus-coated aqueous composition.

11. A surface modification process according to claim 10, wherein said aqueous composition is coated at a coat weight of from 0.01 to 10 g/m$^2$ on a solid basis.

12. A surface modification process according to claim 10, wherein upon drying and curing, said coated aqueous composition is heat-treated at a temperature of at least 100° C. for at least 1 second.

13. A surface modification process according to claim 10, wherein said article is formed of a material selected from the group consisting of metals, fibers, cloths, paper, wood, plastics, synthetic resins, glass, and ceramics.

14. A surface modification process according to claim 10, wherein said article is formed of a metal selected from the group consisting of iron, copper, magnesium, zinc, aluminum, and alloys thereof.

15. A surface modification process according to claim 14, wherein the aqueous composition is directly coated onto a surface of said at least one metal, and is then dried and cured.

16. A surface modification process according to claim 15, wherein said article is a fin blank for an air conditioner.

17. An article comprising, on a surface thereof, a surface modifier coating formed by drying and curing an aqueous composition as defined in claim 1.

18. An article according to claim 17, which is a fin blank for an air conditioner.

19. A molded or otherwise formed product obtained by drying and curing an aqueous composition as defined in claim 1.

* * * * *

UNITED STATES PATENT AND TRADEMARK OFFICE
CERTIFICATE OF CORRECTION

PATENT NO. : 6,858,312 B2  Page 1 of 1
DATED : February 22, 2005
INVENTOR(S) : Kobayashi et al.

It is certified that error appears in the above-identified patent and that said Letters Patent is hereby corrected as shown below:

<u>Title page,</u>
Item [30], Foreign Application Priority Data, should read:
-- [30]  Foreign Application Priority Data

July. 12, 2000  (JP)………………….....2000-211677 --

Signed and Sealed this

Seventeenth Day of May, 2005

JON W. DUDAS
*Director of the United States Patent and Trademark Office*